United States Patent [19]

Clerc

[11] Patent Number: 4,937,566
[45] Date of Patent: Jun. 26, 1990

[54] LIQUID CRYSTAL MATRIX DISPLAY SCREEN PROVIDED WITH STORAGE CAPACITANCES

[75] Inventor: Jean-Frédéric Clerc, Saint Egreve, France

[73] Assignee: Commissariat a l'Energie Atomique, Paris, France

[21] Appl. No.: 181,704

[22] Filed: Apr. 14, 1988

[30] Foreign Application Priority Data

Apr. 28, 1987 [FR] France ............................ 87 06017

[51] Int. Cl.[5] .............................................. G09G 3/36
[52] U.S. Cl. .................................... 340/784; 340/719; 350/336
[58] Field of Search ............... 340/718, 719, 765, 784; 350/331 R, 332, 333, 336, 334

[56] References Cited

U.S. PATENT DOCUMENTS

| 4,040,720 | 8/1977 | York . | |
|---|---|---|---|
| 4,406,997 | 9/1983 | Depp et al. | 340/718 |
| 4,431,271 | 2/1984 | Okubo . | |
| 4,717,244 | 1/1988 | Hilsum et al. | 340/784 |
| 4,728,175 | 3/1988 | Baron | 350/336 |
| 4,753,518 | 6/1988 | Clerc | 340/784 |

FOREIGN PATENT DOCUMENTS 0145520 6/1985 European Pat. Off. .

OTHER PUBLICATIONS

Xerox Disclosure Journal vol. 9, No. 4 Jul./Aug. 1984.

*Primary Examiner*—Jeffery A. Brier
*Attorney, Agent, or Firm*—Nilles & Nilles

[57] ABSTRACT

Liquid crystal matrix display screens in an uncrossed bus-type architecture are characterized in that at each point of the matrix there is a storage capacitance (CS) constituted by a spacer conductor (18,19) connecting part of the point electrode (16,17) surface to the facing part of the counterelectrode (12,13) and at least one of the two electrodes (12 and 16, 13 and 17) is covered by a thin insulating layer (20,21 and 22, 23).

2 Claims, 7 Drawing Sheets

LIQUID CRYSTAL MATRIX DISPLAY SCREEN PROVIDED WITH STORAGE CAPACITANCES

DESCRIPTION

The present invention relates to the field of matrix display by liquid crystal screens.

Matrix screens for dispaly purposes with the aid of liquid crystals are known, which generally comprise:

a sealed cell containing the liquid crystal between two upper and lower, parallel, planar insulating walls;

on the lower wall a matrix of conductive point electrodes, each controlled by an associated thin film transistor and alternate lines of gate conductors and source conductors surrounding each line of point electrodes, the gates of all the transistors being connected in parallel to the adjacent gate conductor, the sources of all the transistors being connected in parallel to the adjacent source conductor and the drains of each transistor being connected to the associated point electrode;

on the upper wall, conductive, transparent counterelectrodes arranged in accordance with the matrix columns and forming with the preceding point electrodes discrete local capacitors, whereof the electrical state determines the optical state of the liquid crystal portion located at the considered point, the counterelectrodes receiving the data signal relative to the corresponding column.

More specifically, the invention relates to liquid crystal matrix screens used for the display of television video signals distributed at a frequency of 50 Hz, i.e., as is conventionally the case, in the form of two half-frames of interlaced lines, whereof each is distributed at a frequency of 25 Hz.

The conductors or supply lines for the electrical informations to the different gates and to the different sources of the thin film transistors are generally deposited on the lower wall of the cell in the form of conductive lines, which are parallel or crossed in accordance with the two main directions of the matrix. These lines, which are called buses in the art, thus lead according to the particular case to architectures known as crossed bus architectures and uncrossed bus architectures. A variant of the uncrossed bus architecture is known as butterfly drain architecture and has two half-point electrodes for each point of the matrix.

In the general case, the transistor associated with the image point electrode by its drain electrode functions under the control of the gate electrode as a simple open or closed switch which, as a function of the particular case, does or does not link the source signal with the image point electrode or, in the particular case of the butterfly drain architecture, the two half-point electrodes.

Figure 1:
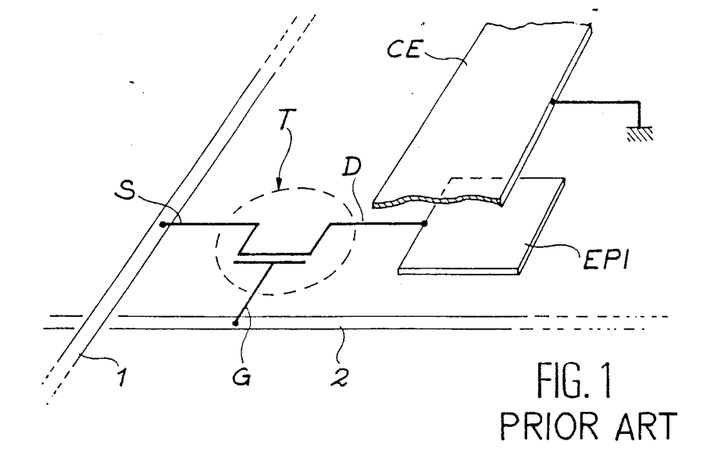
FIG. 1 the known standard architecture of a liquid crystal matrix screen.

Reference will firstly be made to the prior art using as a reference a liquid crystal matrix display screen in a conventional crossed bus architecture. The operating principle of such a system is shown in FIG. 1, where it is possible to see the thin film transistor T with its control grid G, its source electrode S and its drain electrode D, the latter being connected to the image point electrode EPI. As stated hereinbefore, the image point electrode operates in conjunction with a corresponding portion of the counterelectrode CE normally located on the opposite wall, in this case the upper wall of the cell. This counterelectrode CE is connected to earth or ground.

In a known structure of this type, the data or writing signal is supplied to the source bus 1 and the gate signal a grid G controlling the opening or closing of all the transistors of the same line to the gate bus 2. As stated hereinbefore, the described architecture belongs to the architecture type in which the source and gate buses cross at right angles in two directions of the matrix on the lower plate of the cell. The potential difference established between the image point electrode EPI and the associated conuterelectrode portion CE, which form between them a minicapacitor, imposes an electric field on that part of the liquid crystal containing the system and located between these two electrodes. By modifying the local properties of the crystal, this field makes it possible to display at this point a transparency which can range between zero and one, i.e. from black to white passing through all the intermediate grey values.

Figure 2:
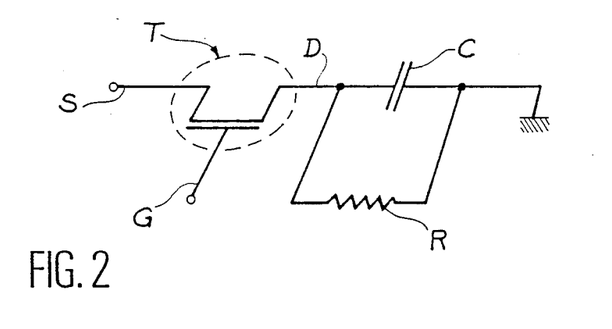
FIGS. 2 and 3 equivalent electrical circuits of the diagram of FIG. 1 in the respective cases of closing and opening the associated thin film transistor.

After describing this known operating principle, FIG. 2 shows the equivalent electric circuit of transistor T and the associated corresponding image point by designating by C the capacitance between the electrode EPI of the image point and the associated counterelectrode portion CE, and by R the leakage resistance of the electrical loads across the liquid crystal in question.

Figure 3:
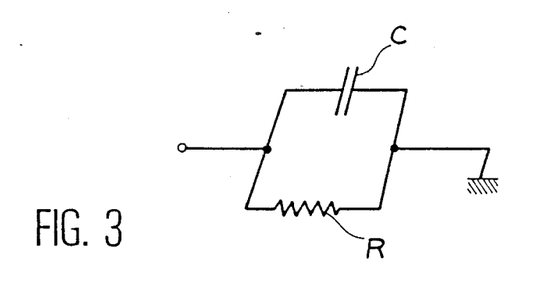

When the transistor T is in open circuit, i.e. between two instants of inscribing the data signal on the screen, the equivalent circuit of the assembly is shown in FIG. 3, where it is in the form of a circuit RC in parallel having a floating potential on one side and being connected to earth on the other. Such a circuit spontaneously discharges in known manner according to an exponential system with a time contant $\tau = RC$.

The known matrix display principle by liquid crystal screen consists of realizing writing and storage time sequences. During a first or writing time, the preceding transistor T is closed under the effect of a gate signal and this applies to all the transistors T of the same line of the matrix. For this reason this first time is sometimes called the line selection time. In accordance with the aformentioned characteristics of a video signal, the appearance frequency of this line selection time is 25 Hz in the present standardized system. When one line of matrix is thus prepared for writing, the different source buses of said matrix supply to each image point electrode of the line the electrical load Q which it is wished to store at this point and which characterizes the information which it is wished to write there. The preceding writing time is, to give an order of magnitude, approximately 64 microseconds. At the end of this writing time, all the transistors T of the same line receive by the gate control bus 2 an opening pulse and the electrical charges Q are left in place on each image point electrode, which is then electrically insulated.

During a second time corresponding to the opening of the transistor and which is called the stroage time, to the extent that it is possible, the thus accumulated charges or loads Q are maintained on each point electrode. Unfortunately, the electrical conduction of the capacitor C constituting each image point and which is due to its leakage resistance is generally more tha adequate to ensure that the charge stored on the corresponding point disappears before the following information of the video signal arrives at the freqeuncy of 25 Hz, i.e. 40 ns later.

Thus, the charge or load disappearance law is exponential and can be written $Q = Q_o e^{-t/\tau}$, $\tau$ being the time constant of the phenomenon and which, for standard screens, is 60 milliseconds. Thus, said time τ, at the end of which only half the charges exist at each point, is not negligible compared with the refresh time of the video signal which, for a frequency of 25 Hz, is equal to 40 milliseconds. Therefore the observer looking at the screen very quickly sees a flicker phenomenon due to the fact that the inadequately excited liquid crystal molecules return to their initial transparency state between two line scans and erase most of the written information.

To summarize what has been stated hereinbefore, it can be said that the distribution cartography of the charges or loads on the different point electrodes of the matrix evolves at a frequency of 25 Hz (image refresh phenomenon), but that said frequency is too low to mask the spontaneous loss of said information by the consumption of said same charges in the leakage resistances of the different point capacitors of the matrix.

Moreover, the preceding time constant τ can be written $\tau = \rho\epsilon$, formula in which $\rho$ is the resistivity of the liquid crystal and $\epsilon$ its dielectric constant. However, the resistivity $\rho$ greatly decreases with the temperature, so that e.g. at 60° C., the time constant τ drops to values of approximately 20 milliseconds, which greatly accentuates the aformentioned flicker. This prevents the use of matrix screens under severe conditions, such as are encountered in certain industrial applications or in installations exposed to temperatures higher than the standard ambient temperatures.

To obviate the aforementioned disadvantages it has already been proposed in the art to use additional or so-called storage capacitances making it possible to increase the capacitance and therefore the time constant of the discharge circuit of each capacitor associated with each image point.

Figure 4:
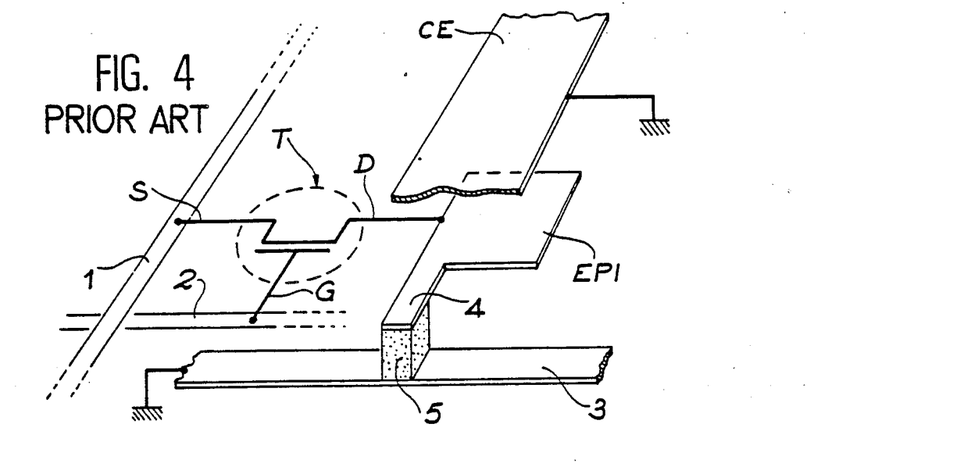
FIG. 4, which also represents the prior art, the application of a storage capacitance to the crossed bus structure of FIG. 1.

A known solution of this type is shown in FIG. 4 and consists of providing on the matrix of the screen additional conductor lines or buses, which are earthed and of placing a leak-free insulant at each point of the matrix between an extension of the image point electrode and said earth bus. This leak-free insulant constitutes the storage capacitance.

Figure 5:
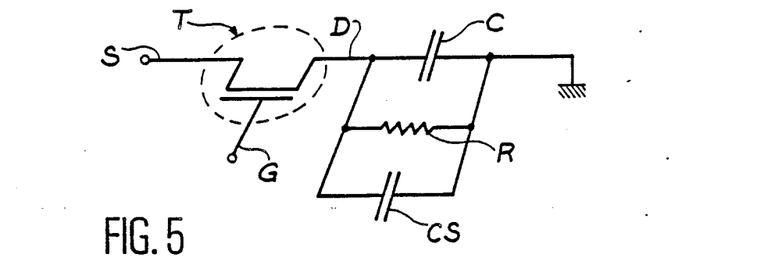
FIGS. 5 and 6 equivalent electrical circuits to the diagram of FIG. 4, in the respective hypotheses of closing and opening the transistor associated with each image point.

With the same references as in FIG. 1, FIG. 4 shows the elements of a matrix screen structure in the vicinity of an image point. In the known case of FIG. 4 an additional bus at earth 3 is provided, as well as an extension 4 of the image point electrode EPI, in such a way that these two latter elements are partly superimposed at right angles and between the two is placed a leak-free insulating material block 5, which constitutes a storage capacitance. FIG. 5 shows with the same references as hereinbefore, the equivalent electrical circuit with the capacitance C of the image point and the storage capacitance CS, which is shown to be in parallel with the capacitance C.

Figure 6:
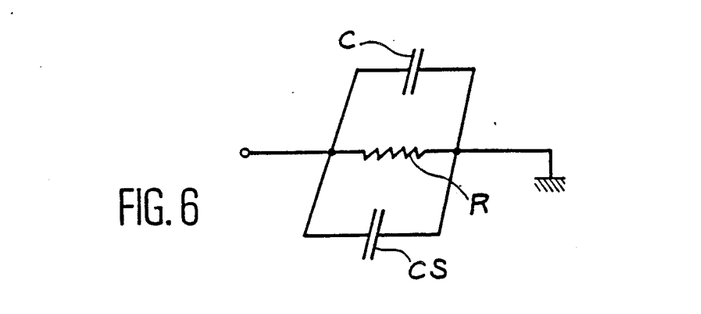

When during the stroage times the transistor T is closed, the equivalent electrical circuit is that of FIG. 6, which can be likened to that of FIG. 3, except that the capacitances C and CS are in parallel, are summated and consequently increase the time constant of this circuit which becomes:

$$\tau = R(C+CS).$$

Thus, if CS significantly exceeds C, there is a large increase in the time constant τ and the electrical potential applied to each minicapacitor can be satisfactorily maintained between two successive refreshing operations of the video signal, thus largely avoiding flicker.

Unfortunately, this known methode has only hitherto been applied to the matrix screen structures known as crossed bus structures and it suffers from the major disadvantage of requiring additional conductors, which make these structures more complicated.

The present invention more particularly relates to the extension to uncrossed bus and butterfly drain architectures of the notion of the storage capacitance, thus enabling the two latter architectures, which have significant advantages as compared with the crossed bus architecture, to benefit in a particularly simple manner from the advantages of the storage capacitance.

The present invention therefore relates to a liquid crystal matrix display screen in an uncrossed bus architecture, characterized in that is it provided at each point of the matrix with a storage capacitance constituted by a spacer conductor connecting part of the surface of the point electrode to the facing part of the counterelectrode, with the interposing, over at least one of the two preceding electrodes of a thin insulating layer. In other words, at least one of the electrodes is covered by a thin insulating layer where it joins the spacer conductor.

The invention also relates to a liquid crystal matrix display screen in a butterfly drain architecture characterized in that it is provided at each point of the matrix with a storage capacitance constituted by a capacitive coupling against the two associated point electrodes.

The matrix screen structures according to the invention consequently make it possible in a simple manner and without using additional buses to give the advantages of the storage capacitance principle to uncrossed bus and butterfly drain architectures, which hitherto did not appear to be simple or even envisageable up to now.

The invention will be better understood from the preceding or following description of the prior art and the object of the invention, given in an illustrative and non-limitative manner and with reference to the attached FIGS. 1 to 21, wherein show:

FIGS. 8 and 9 equivalent electric diagrams of the structure of

FIG. 7 in the respective hypotheses of closed and open transistors.

Figure 7:
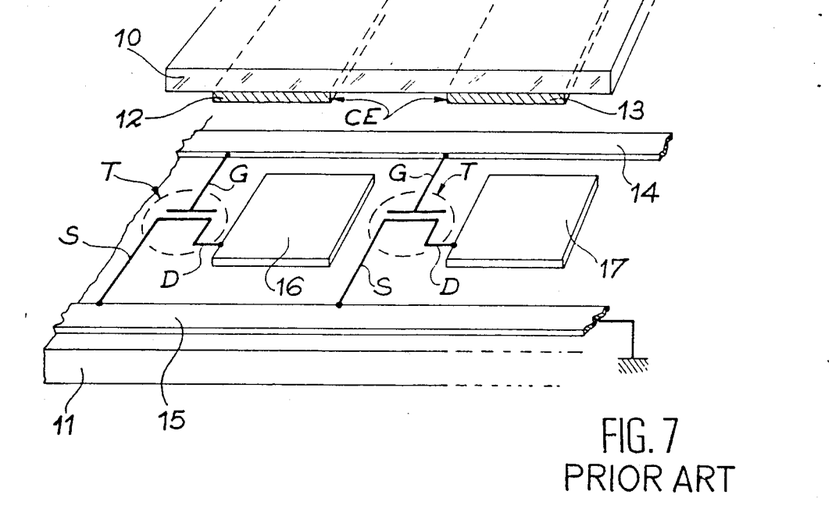
FIG. 7 the basic circuit diagram of a prior art liquid crystal matrix screen structure in the uncrossed bus architecture.

On firstly considering matrix screens using the uncrossed bus architecture, with reference to FIG. 7, a description is firstly given of a known architecture of this type. FIG. 7 shows in exploded form the elements of a liquid crystal matrix display screen, in the form of the upper wall 10 and lower wall 11 of a liquid crystal cell, the latter not being visible in the drawing. As is known, on the upper wall 10 constituted e.g. by a glass substrate are placed in accordance with the columns of the matrix, counterelectrode lines 12 and 13 for receiving the video or data signal. On the lower wall 11 are arranged in accordance with the lines of the matrix and in alternating manner gate control buses 14 and source buses 15. The latter is earthed and are common to all the electrodes of the image point of a same line, such as 16 and 17. This structure has thin film transistors T with gate electrodes G, source electrodes S and drain electrodes D connected to each image point of the matrix.

Figure 8:
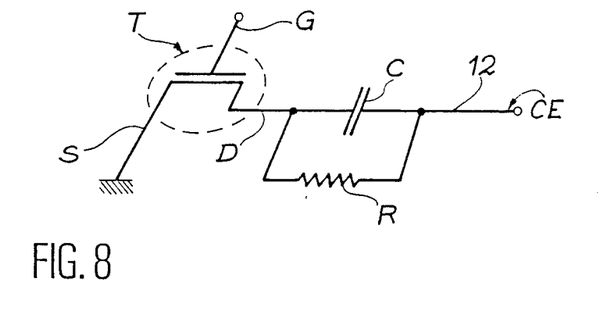

The equivalent electrical diagram of the structure of FIG. 7 for one point of the image is shown in FIG. 8, where the same elements as in FIG. 7 carry the same references. As in FIGS. 2 to 6, C designates the capacitance between each image point electrode 16,17 and the counterelectrode part 12,13 facing the same, whilst R is the leakage resistance of the minicapacitor corresponding to each image point.

Figure 9:
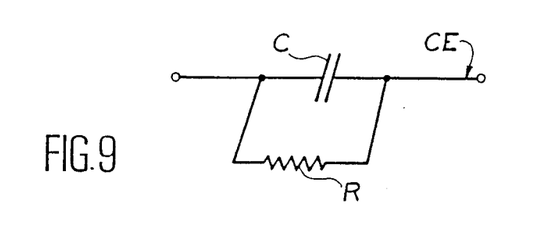

FIG. 9 gives the state of the electric circuit of FIG. 8 when, during the storage time of the video signal by the screen, transistor T of FIG. 8 being open, the preceding circuit RC is closed on itself between a source electrode S at a floating potential and a counterelectrode CE connected to the data video signal.

As in the case of the crossed bus architecture of FIG. 6, the circuit of FIG. 9 is a circuit which exponenetially discharges with a time constant $\tau = RC$, leading to all the prejudical consequences explained hereinbefore causing the flicker phenomenon.

Figure 10:
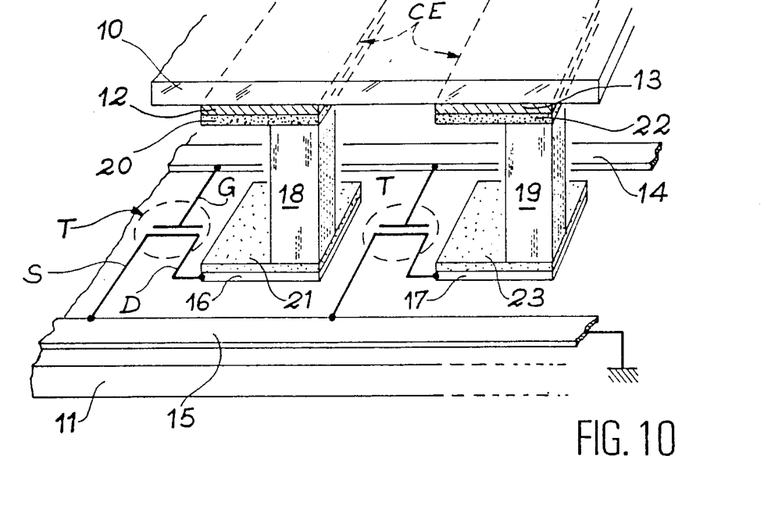
FIG. 10 the structure according to the invention in an uncrossed bus architecture of a matrix screen equipped with a storage capcitance.

According to the invention, such an uncrossed bus architecture matrix screen is shown in FIG. 10 provided with storage capacitances. FIG. 10 shows all the elements of FIG. 7 with the same references and to these are added the spacer conductors 18,19 in the form of conductive material blocks, which extend between the counterelectrode CE of the upper wall and the image point electrodes 16,17 of the lower wall with the interposing of a leak-free dielectric layer 20,21,22,23 between the facing electrodes and the spacer conductors 18,19.

According to the invention these spacer conductors 18,19 can be located by any point of the surface of the image point electrode 16,17 and the corresponding conductive counterelectrode part CE.

They can be made from any known conductive material and e.g. can be constituted by metal studs deposited and etched during the production of the matrix, or screen printed conductive glues, or glass fibres covered with metal. They can be geometrically shaped like parallelepipeds, as shown in the embodiment of FIG. 10. The insulants 20,21,22 and 23 necessary for producing the desired local capacitances, as will be shown hereinafter are made from dielectric materials, whereof the leaks are as low as possible, such as e.g. polymers, namely polyimides, nylon, etc., silica, nitrides, etc. and any other known material for passivating the transistors and/or orienting the liquid crystals.

Figure 11:
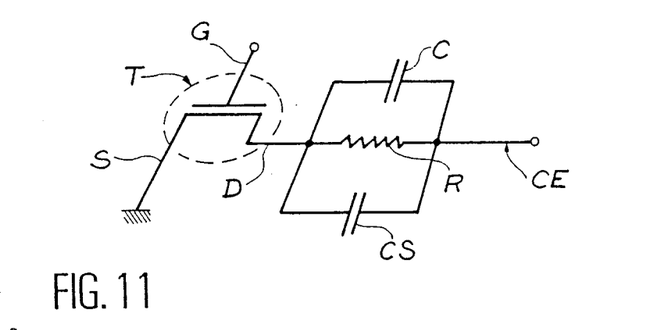
FIGS. 11 and 12 equivalent electrical circuits to the diagram of FIG. 10, in the respective hypotheses of closed and open control transistors.
Figure 12:
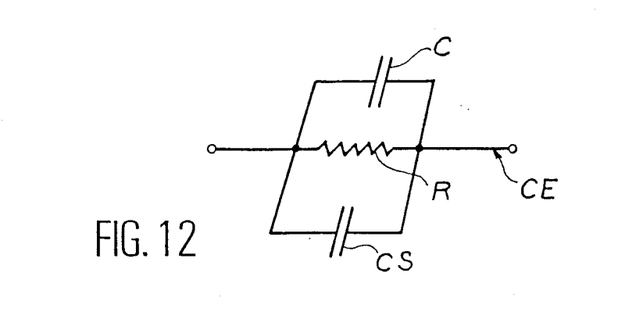

FIGS. 11 and 12 reveal the formation of a storage capacitance at each image point of the matrix with the aid of the specific structures of FIG. 10. FIG. 11 shows the equivalent electrical circuit of the elements of FIG. 10 and which carry the same references.

If C is the capacitance of the single capacitor formed by the electrodes, such as 12 and 16 externally of the spacer conductor 18 and CS is the capacitance produced locally between these two same electrodes 12 and 16 by the system of the two insulants 20,21 on the one hand and the spacer 18 on the other, it is clear that these two capacitances are in parallel and an electrical diagram like that of FIG. 11 is obtained. During the opening of transistor T, i.e. during the storage time, the diagram is that of FIG. 12, in which the drain electrode D isa t a floating potential and the counterelectrode CE at the potential of the data video signal. The diagram of FIG. 12 makes it possible to write the time constant $\tau$ of the electrical circuit of FIG. 12 in the form:

$$\tau = R(C + CS).$$

The capacitance CS constituted by the sandwich formed by the point electrode portion, the insulant, the spacer conductor, the insulant and the counterelectrode portion acts lide a storage capcitance electrically equivalent to the capacitance CS of FIG. 6 according to the prior art.

With reference to FIGS. 13 to 17, a description will now be given of the application according to the invention of a storage capacitance to a butterfly drain architecture of a liquid crystal matrix screen.

Figure 13:
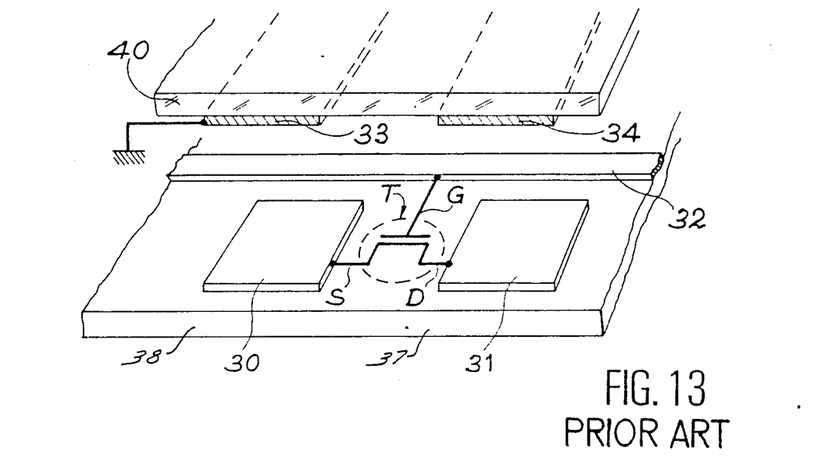
FIG. 13 the state of the art for a butterfly drain architecture without a storage capacitor of a liquid crystal matrix screen structure.
Figure 14:
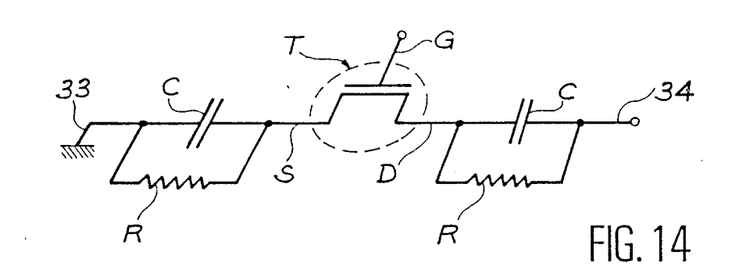
FIGS. 14 and 15 respectively the equivalent electrical circuits of the structure of FIG. 13 in the hypotheses of closed and then open transistors.
Figure 15:
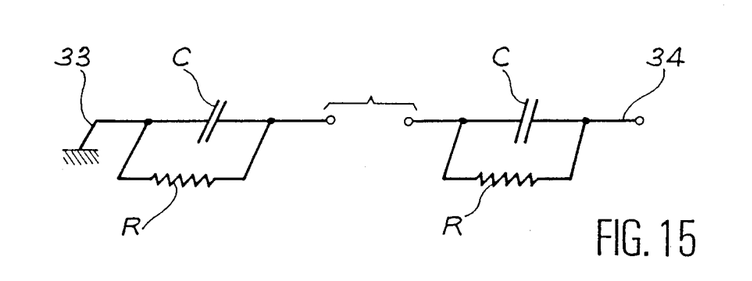

With reference to FIGS. 13,14 and 15, it is firstly pointed out that it is the per se known structure of the butterfly drain in such a matrix screen. The same structural elements appear with the same references as hereinbefore in FIG. 13. However, two basic features characterize the said butterfly drain structure. The first is that each image point electrode 37 on a lower insulating wall 38 is subdivided into two half-electrodes, such as 30 and 31 in FIG. 13, said two half-point electrodes 30,31 being respectively connected to the drain electrode D and to the source electrode S of the thin film transistor T associated with the corresponding point. The second is that as the sole conductor in the matrix line directions, it only has gate control buses such as 32, which connect in parallel, as in the other structures, the different gate electrodes G of the transistors T of the same line.

Finally, on the upper insulating wall 40 are located in the matrix column directions of the counterelectrodes screen, respectively an earthed reference electrode 33 above the half-point electrode 30 and a counterelectrode supplied by the data signal 34 above the second half-point electrode 31.

It is easy to see that the equivalent electrical circuit of such a structure corresponds to that of FIG. 14, which contains the corresponding references of FIG. 13. The capacitances C and leakage resistances R shown in FIG. 14 respectively correspond to the capacitances and leakage resistances of each of the half-capacitors corresponding to the association of each half-point electrode with the corresponding counterelectrode.

When, during the storage time, all the transistors T control the opening of the drain-source circuit, under the influence of a signal transmitted by the control bus 32, the equivalent electrical circuit then becomes that of FIG. 15, in which the two half-circuits are insulated and have their corresponding electrodes S and D at a floating potential. Under these conditions, each image point half-capacitance has a time constant $\tau = RC$ and consequently discharges exponentially with said time constant $\tau$, as in the other matrix screen architectures.

Figure 16:
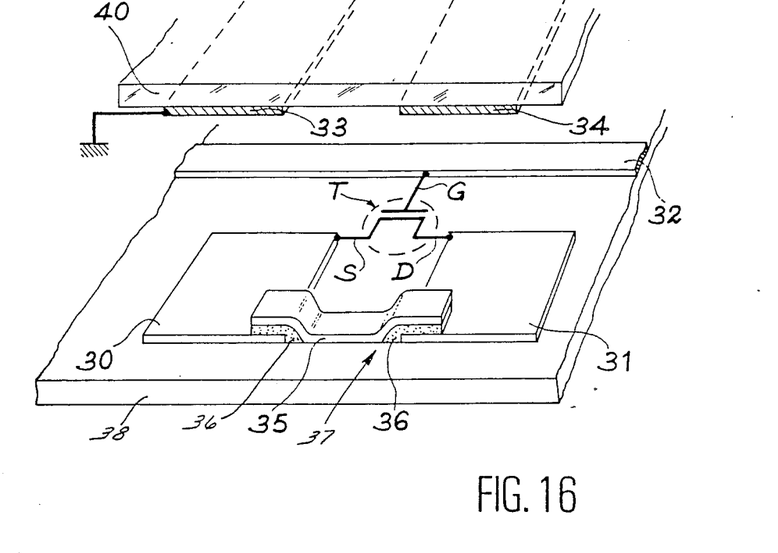
FIG. 16, in a butterfly drain-type architecture, a matrix screen structure provided with a storage capacitance according to the invention.

According to the invention, in order to provide such a structure with a storage capacitance eliminating flicker during its supply with a video signal, as in FIG. 16, a capacitive coupling is brought about between the two half-electrodes 30,31 with the aid of a metal conductive bar 35, which is insulated by an inuslating layer 36 from the two half-electrodes 30,31.

This particularly simple structure effectively constitutes for the considered image point a storage capcitance, as would be made apparent by the following description relative to FIGS. 17 to 21. However, in the particular case of the butterfly drain architecture, the electrical examination making it possible to ensure that the structure of FIG. 16 does in fact contain a storage capacitance is more difficult, because it is here necessary to take account of the distribution of the electrical charges over the different electrodes.

Figure 17:
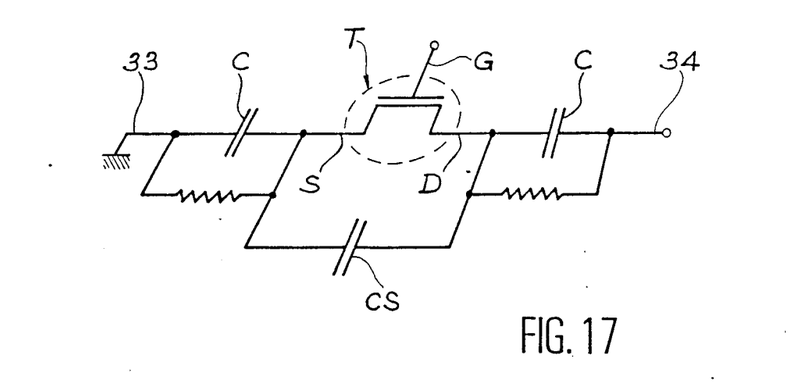
FIGS. 17,18,19,20 and 21 the equivalent electrical circuits in the general case (FIG. 17), in the case of a closed circuit transistor (FIG. 18) and an open circuit transistor (FIGS. 19,20 and 21).

The equivalent electrical diagram of the structure of FIG. 16 is given in FIG. 17, where the same references appear and which can be interpreted without difficulty. It is merely necessary to understand that the capacitance CS is the sum of the elementary capacitances constituted in each case by half-electrodes 30,31 with the metal conductive bar 35 across the leak-free insulant 36.

Figure 18:
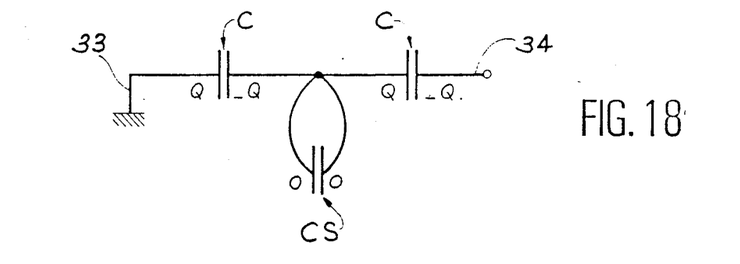

During the addressing time of the lines, i.e. during the closing of each of the transistors T, the electrical diagram is that of FIG. 18 in which, the electrical charges and the foils of the two capacitors C are distributed as indicated at Q and $-Q$. this electrical charge or load Q on the foils in such that $Q = C \times V_s/2$, if $V_s$ is the instantaneous voltage of the data signal applied to the counterelectrode 34. Capacitor CS is short-circuited and its charges at the foils are zero.

Figure 19:
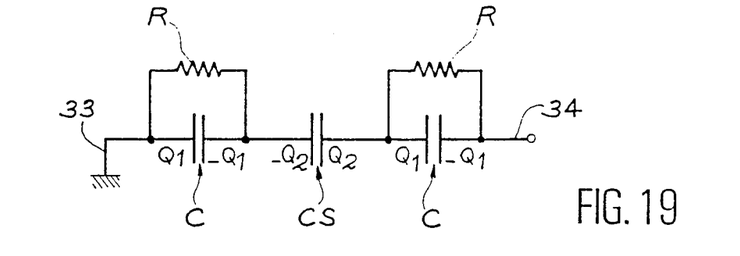
Figure 20:
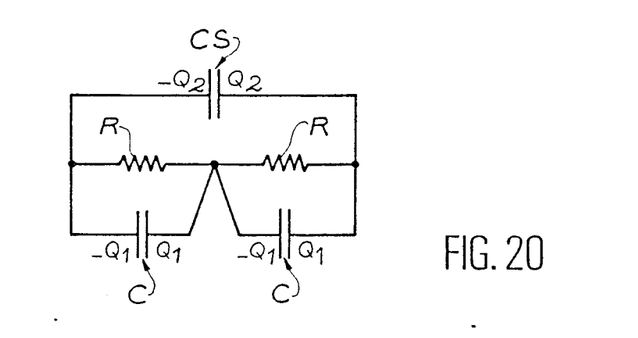
Figure 21:
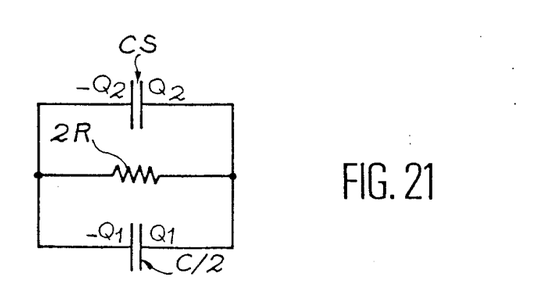

The electrical equivalent of the same circuit when the transistor T is in open circuit during the storage phase is shown in FIG. 19 for which account has been taken of the fact that the preceding charge Q is distributed at Q1 on the foil of the capacitance of the image point 30 and Q2 on the foil of the capacitance 35. In symmetrical manner, Charge $-Q$ is distributed at $-Q1$ and $-Q2$ and clearly $Q = Q1 + Q2$. the advance in the interpretation of this equivalent diagram, it is pointed out that as the data signal 34 has no continuous component it is an alternating signal at, whose mean value is zero. It is therefore electrically equivalent to the reference signal present at 33 and it is possible to loop the system on itself to obtain the equivalent diagram of FIG. 20. The latter is finally simplified according to that of FIG. 21, which makes it possible to affirm that it is an RC-type circuit, whose spontaneous discharge time constant is $\tau = 2R(C/2 = CS)$.

Thus, the capacitance CS is added in the determination of this time constant to the capacitance C determined between the point electrodes and the counterlectrodes, so as to serve as a storage capacitance.

I claim:

1. Liquid crystal matrix display screen having, in an uncrossed bus-type architecture:
    a closed cell containing the liquid crystal between two lower (11) and upper (10) parallel, planar, insulating walls,
    on the lower wall (11) a matrix of conductive point electrodes (16,17), each controlled by a thin film transistor (T) and alternating lines of gate conductors (14) and source conductors (15) surrounding each line of point electrodes (16,17), the gates (G) of all the transistors (T) being connected in parallel to the adjacent gate conductor (14), the source electrodes (S) of all the transistors (T) being connected parallel to the adjacent source conductor (15) and the drain electrodes (D) of each transistor (T) being connected to the associated point electrode (16,17),
    on the upper wall (10) conductive, transparent counterelectrodes (12,13), disposed in accordance with columns of the point electrodes (16,17) of the matrix and forming with the point electrodes (16,17), discrete local capacitors (C), whereof the electrical state determines the optical state of the liquid crystal portion located thereat, the counterelectrodes (12,13) receiving a data signal relative to a corresponding column;
    characterized in that each point of the matrix whereat a point electrode (16,17) is located is provided with a storage capaictance (CS) comprising a spacer conductor (18,19) for electrically connecting part of the surface of a point electrode (16,17) to the facing part of a counterelectrode (12,13), and a thin insulating leak-free dielectric layer (20,21,22,23) disposed between said spacer conductor (18,19) and at least one of the associated point electrode (16,17) and the associated counterelectrode (12,13).

2. Liquid crystal matrix display screen having, in a butterfly drain-type architecture:
    a closed cell containing the liquid crystal between two lower (38) and upper (40) parallel, planar, insulating walls;
    on the lower wall (38) a matrix of conductive point electrodes (37), each controlled by a thin film transistor (T) and lines of gate conductors (32) surrounding each line of point electrodes (37), each point electrode (37) being constituted by two adjacent half-electrodes (30,31), the gates (G) of all the transistors (T) being connected in parallel to the adjacent gate conductor (32), the source electrode (S) and drain electrode (D) of each transistor (T) being respectively connected to one of the two half-electrodes (30,31) of the point electrode (37) associated with the transistor (T);
    on the upper wall (40) transparent, conductive double counterelectrodes (33,34) arranged in accordance with the columns of the point electrodes (37) on the matrix and forming with the half-point electrodes (30,31), discrete local capacitors, whereof the electrical state determines the optical state of the liquid crystal portion located thereat, one of the two counter-electrodes (33,34) of each column being grounded and the other receiving a data signal relative to the corresponding column;

characterized in that each point of the matrix whereat a half-electrode (30,31) is located is provided with a storage capacitance (CS) comprising a capacitive coupling (35,36) between the two associated half-point electrodes (30,31), said capacitive coupling (35,36) comprising an electrically conductive metal member (35) and an insulating layer (36) between said metal member (35) and each half-electrode (30,31).

* * * * *